United States Patent
Croker

(10) Patent No.: US 6,423,898 B1
(45) Date of Patent: Jul. 23, 2002

(54) SUPPORT MEMBER FOR A CABLING AND ASSOCIATED EQUIPMENT ENCLOSURE

(75) Inventor: Brian A. Croker, Berkshire (GB)

(73) Assignee: APW Ltd., Waukesha, WI (US)

( * ) Notice: Subject to any disclaimer, the term of this patent is extended or adjusted under 35 U.S.C. 154(b) by 0 days.

(21) Appl. No.: 09/688,905

(22) Filed: Oct. 16, 2000

(30) Foreign Application Priority Data

Oct. 18, 1999 (GB) .............................................. 9924540

(51) Int. Cl.[7] .................................................. F16L 3/22
(52) U.S. Cl. ........................... 174/50; 174/48; 248/68.1; 385/135
(58) Field of Search ..................... 174/50, 68.3, 72 A, 174/101, 49, 48, 60, 67; 220/3.2, 3.8, 3.3, 4.02, 4.01; 361/826; 385/134, 135, 136, 137; 248/68.3, 74.2

(56) References Cited

U.S. PATENT DOCUMENTS

| | | | |
|---|---|---|---|
| 3,718,307 A | * 2/1973 | Albanese | 248/68.1 |
| 5,023,404 A | * 6/1991 | Hudson et al. | 174/68.3 |
| 5,448,015 A | 9/1995 | Jamet et al. | |
| 5,458,019 A | * 10/1995 | Trevino | 385/135 |
| 5,587,555 A | * 12/1996 | Rinderer | 174/49 |
| 5,640,482 A | 6/1997 | Barry et al. | |
| 5,743,497 A | * 4/1998 | Michael | 248/68.1 |
| 5,752,682 A | * 5/1998 | Anderson | 248/68.1 |
| 5,831,216 A | * 11/1998 | Hoffmann | 174/135 |
| 5,872,336 A | 2/1999 | Long | |
| 5,918,837 A | * 7/1999 | Vicain | 174/135 |
| 5,988,570 A | * 11/1999 | Gretz | 248/68.1 |
| 6,012,685 A | * 1/2000 | Saraceno, Jr. | 248/68.1 |
| 6,127,631 A | * 10/2000 | Green et al. | 174/135 |
| 6,170,784 B1 | * 1/2001 | MacDonald et al. | 248/68.1 |
| 6,254,041 B1 | * 7/2001 | Dufourg | 174/49 |

FOREIGN PATENT DOCUMENTS

| | | |
|---|---|---|
| DE | 2043 168 A | 3/1972 |
| DE | 92 08 215.7 U1 | 7/1993 |
| EP | 0593927 A1 | 9/1993 |
| GB | 2292466 A | 2/1996 |

* cited by examiner

*Primary Examiner*—Dean A. Reichard
*Assistant Examiner*—Angel R. Estrada
(74) *Attorney, Agent, or Firm*—Quarles & Brady LLP

(57) ABSTRACT

An enclosure for housing cabling and associated equipment has a frame structure including one or more elongated support members. The support members are formed with an arcuate flange extending in a direction away from the uppermost edge of the support member. The arcuate flange will support any cables that are laid over the top of the support member, with the cable following the smooth arc of the flange. This gradual transition from the vertical plane to the horizontal plane means the cable will not deform or form kinks. Cabling entering the enclosure from a direction above the flange of a support member will be less likely to be caught inadvertently in U-shaped attachment slots because of the oblique angle of the slots and the presence of the cantilever tongues.

18 Claims, 2 Drawing Sheets

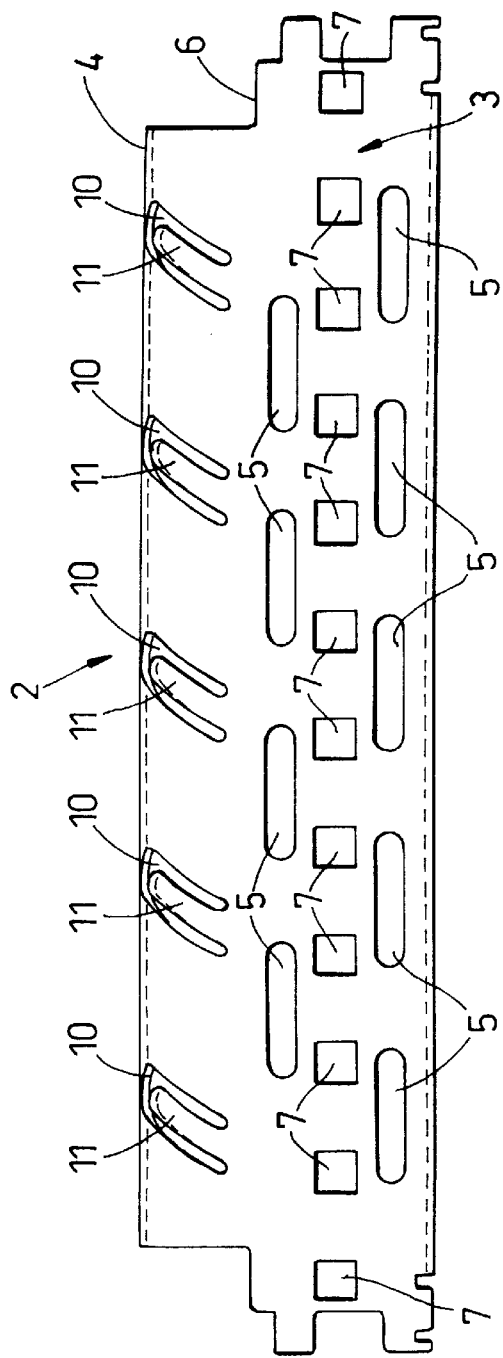
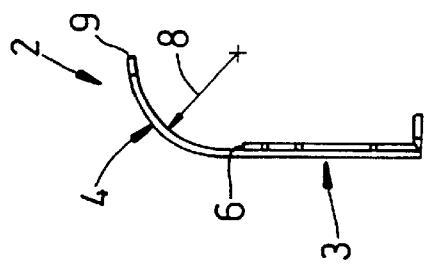
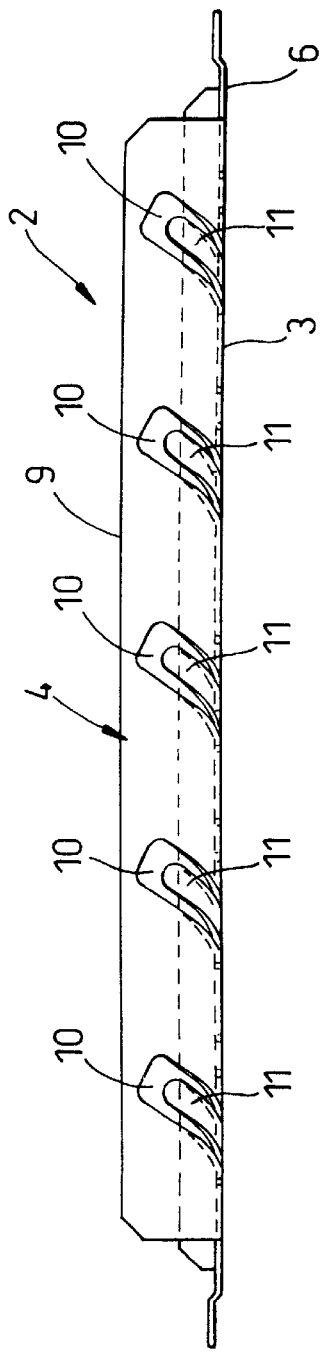

SUPPORT MEMBER FOR A CABLING AND ASSOCIATED EQUIPMENT ENCLOSURE

BACKGROUND OF THE INVENTION

The present invention relates to a support member for an enclosure for housing cabling and associated equipment.

A vast amount of cabling is used in the telecommunication and electronics industry. Existing cabinets that are used to house the junctions of cabling and associated equipment are normally floor standing. However, in some situations a smaller cabinet is required and this may be wall mounted.

Easy access to the cabling is important and existing cabinets include detachable panels. Many existing cabinets comprise a frame structure and a plurality of panels mounted thereon. The frame structure generally includes elongate support members formed by presswork and which may support a panel or equipment housed within the cabinet. The support members are formed from sheet metal and holes and locating slots are punched through walls of the members. The wall sections of the support members are commonly channel sections and L-shaped sections, the walls of which are substantially at right angles and connected by a local fold which defines a corner of small radius.

When cabling is inserted into the cabinets the end of the cable can often become caught in one of the holes or locating slots of a support member. This problem occurs particularly when a cable is inserted in a direction that is perpendicular to the surface of a supporting member that lies in the path of the cable.

Whilst the principal function of a support member is to constitute part of the cabinet framework, they are often used to support a cable when the direction of the cable is changed. For example, when the direction of the cable is changed from the vertical to the horizontal, or vice versa. The cable may be fed vertically into the cabinet through the bottom of the cabinet so as to rest against a vertical side face of a horizontal support member and may then be bent over the top of the support member such that the direction of the cable changes from the vertical to the horizontal. The cable is constrained to follow substantially the curvature of the corner of the support member. The radius of curvature of the corner can be significantly small and this can result in the cable being deformed or forming a kink.

BRIEF SUMMARY OF THE INVENTION

According to a first aspect of the present invention there is provided a sheet metal support member for a cabling enclosure, the support member comprising a substantially arcuate cable-support surface, as viewed in transverse cross-section.

The radius of curvature of the cable-support surface is preferably greater than 10 mm and is most preferably greater than 15 mm.

Preferably, the support member comprises an arcuate flange the radially outer surface of which constitutes the cable-support surface.

The support member preferably comprises an elongate body plate, one margin of the body plate being contiguous with the arcuate flange.

Preferably the body plate and the arcuate flange are formed from the same blank by pressing The arcuate flange is preferably formed with attachment means.

The attachment means preferably comprises an aperture extending through the arcuate flange.

The aperture is preferably a slot that extends in a direction that is askew from the curvature of the arcuate flange, that is, the longitudinal centerline of the slot does not lie in a transverse plane of the arcuate flange, and preferably the longitudinal centerline of the slot is at an oblique angle to said plane.

Preferably the slot is U-shaped to define a cantilever member.

Preferably the attachment means is a cable attachment means.

The aforesaid cantilever member is suitable for attachment of a cable tie.

The cantilever member is preferably directed towards the free edge of the arcuate flange.

Preferably the arcuate flange is formed with a plurality of cable attachment means.

According to a second aspect of the present invention there is provided an enclosure for cabling and associated equipment, the enclosure comprising at least one support member in accordance with the first aspect of the present invention.

The present invention may be carried into practice in various ways, but an embodiment will now be described, by way of example only, with reference to the accompanying drawings in which:

BRIEF DESCRIPTION OF THE DRAWINGS

FIG. 1 shows a side view of a support member for a cable enclosure,

FIG. 2 shows a plan view of the support member for a cable enclosure as shown in FIG. 1, FIG. 3 shows a front view of the support member for a cable enclosure as shown in FIG. 1.

DETAILED DESCRIPTION OF THE PREFERRED EMBODIMENT

Figure 4:
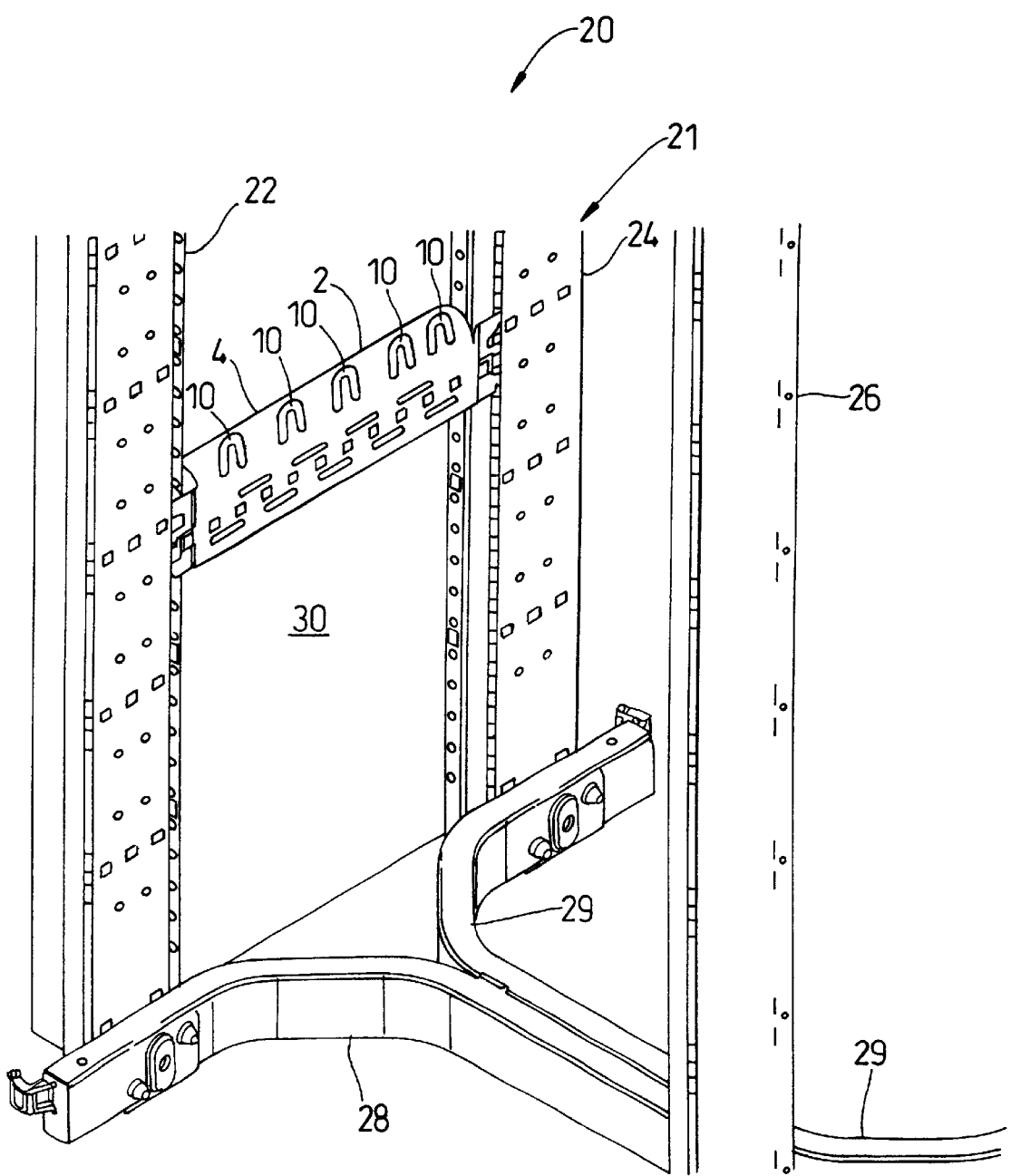
FIG. 4 shows a partial isometric view of an enclosure for cabling and associated equipment comprising a support member as shown in the FIGS. 1 to 3.

Referring to the FIGS. 1 to 3, an elongate support member 2 for a cabling enclosure is formed with an arcuate flange 4 extending in a direction away from the uppermost edge 6 of the support member 2.

The support member 2 is manufactured by being pressed from a single sheet plate. A vertical generally rectangular body plate 3 of the support member 2 is formed with a series of nine spaced elongate slots 5 and twelve square holes 7. A punching process forms the slots 5 and holes 7. The slots 5 and holes 7 are used for locating and securing cables, cable ties and other cabinet support members and struts.

The arcuate flange 4 extends through an arc of a radius 8. The radius 8 is, for example, 22 mm and the overall length of the support member 2 is, for example, 309 mm. The arcuate flange 4 extends through an arc of about 90 degrees. The distal end portion 9 of the arcuate flange 4 is substantially in a horizontal plane. The arcuate flange 4 is formed with five U-shaped slots 10 that extend through the flange 4. A cantilever tongue 11 forms the innermost edges of each respective U-shaped slot 10.

The two longitudinal sides of each tongue 11 are equidistantly spaced from the outermost longitudinal edges of the respective slot 10. The curved longitudinal centerline of the tongue 11 corresponds with the curved longitudinal centerline of the U-shaped slot 10. The centerline of the U-shaped slot is at an oblique angle to the vertical cross-section curve of the flange 4, that is at an oblique angle to a transverse plane of the support member.

Although there are advantages in the flange being manufactured from the same plate piece as the body plate, the skilled man will appreciate that the arcuate flange may be formed separately from the body plate and then fixed to the body plate.

With reference to FIG. 4, a partially assembled enclosure 20 for cabling and associated equipment comprises a frame structure 21 and a number of closure panels 30 detachably mounted on the frame structure 21. The frame structure 21 comprises a support member 2 as herein before described with reference to FIGS. 1 to 3.

The frame structure 21 also comprises four vertical struts 22, 24, 26 (the fourth strut not shown in FIG. 4). Two U-shaped box sections 28, 29 are attached to the lowermost ends of the vertical struts 22, 24, 26. The box sections 28, 29 rest on the ground. The support member 2 is attached to the vertical struts 22, 24 and forms a cross member there between. A plurality of support members 2 may be attached to the vertical struts 22, 24, 26.

In FIG. 4 only one panel 30 is shown; however, the enclosure 20 may comprise a plurality of panels that enclose the frame structure 21. One or more of the panels 30 may form a door panel. Also, the panels 30 may be formed with cabling access slots.

In use one or more support members 2 form part of the frame structure 21 of the enclosure 20 for housing cabling and associated equipment. Cabling entering the enclosure from a direction above the flange 4 of a support member 2 will be less likely caught in the U-shaped slots 10 because of the oblique angle of the slots 10 and the presence of the cantilever tongues 11. The arcuate flange 4 will support any cables that are laid over the top of the support member 2. The cable will follow the smooth arc of the flange 4. This gradual transition from the vertical plane to the horizontal plane means the cable will not deform or form kinks.

What is claimed is:

1. A sheet metal support member for a cabling enclosure, the support member comprising an arcuate flange forming a substantially arcuate cable support surface and an elongate body plate contiguous with the arcuate flange, the arcuate flange having attachment means comprising an aperture extending through the arcuate flange.

2. A sheet metal support member as claimed in claim 1, wherein the aperture is a slot that extends in a direction that is askew from a curvature of the arcuate flange, that is, the longitudinal centerline of the slot does not lie in a transverse plane of the arcuate flange.

3. A sheet metal support member as claimed in claim 2, wherein the longitudinal centreline or the slot is at an oblique angle to said plane.

4. A sheet metal support member as claimed in claim 2, wherein the slot has a U-shape that defines a cantilever member.

5. A sheet metal support member as claimed in claim 4, wherein the cantilever member is directed towards a free edge.

6. A sheet metal support member as claimed in claim 1 wherein the arcuate flange is formed with a plurality of cable attachment means.

7. A sheet metal support member for a cabling enclosure as claimed in claim 1, wherein a radius of curvature of the cable-support surface is greater than 10 mm and is most preferably greater than 15 mm.

8. A sheet metal support member as claimed in claim 1 wherein the aperture is a slot having a U-shape that defines a cantilever member.

9. A sheet metal support member as claimed in claim 1, wherein the body plate and the arcuate flange are formed from a single blank.

10. An enclosure for cabling and associated equipment, the enclosure comprising a support frame structure and a plurality of panels at least some of the panels being detachably mounted on the frame structure, the support frame structure comprising at least one support member comprising an arcuate flange forming a substantially arcuate cable-support surface and an elongate body plate contiguous with the arcuate flange;

wherein the arcuate flange has attachment means comprising an aperture extending through the arcuate flange.

11. An enclosure for cabling and associated equipment as claimed in claim 10, wherein the aperture is a slot that extends in a direction that is askew from the curvature of the arcuate flange, that is, a longitudinal centreline of the slot does not lie in a transverse plane of the arcuate flange.

12. An enclosure for cabling and associated equipment as claimed in claim 11, wherein the longitudinal centreline of the slot is at an oblique angle to said plane.

13. An enclosure for cabling and associated equipment as claimed in claim 11, wherein the slot has a U-shape that defines a cantilever member.

14. An enclosure for cabling and associated equipment as claimed in claim 13 wherein the arcuate flange is formed with a plurality of cable attachment means.

15. An enclosure for cabling and associated equipment as claimed in claim 13, wherein the cantilever member is directed towards a free edge.

16. An enclosure for cabling and associated equipment for a cabling enclosure as claimed in claim 10, wherein a radius of curvature of the cable-support surface is greater than 10 mm and is most preferably greater than 15 mm.

17. An enclosure for cabling and associated equipment as claimed in claim 10, wherein the body plate and the arcuate flange are formed from a single blank.

18. An enclosure for cabling and associated equipment as claimed in claim 10 wherein the aperture is a slot having a U-shape that defines a cantilever member.

* * * * *